(12) United States Patent
Hall et al.

(10) Patent No.: US 11,331,970 B2
(45) Date of Patent: May 17, 2022

(54) WEIGHT DISTRIBUTION HITCH

(71) Applicant: Hall Labs LLC, Provo, UT (US)

(72) Inventors: David R. Hall, Provo, UT (US);
Michael Hall, Provo, UT (US);
Chandler Flinders, Provo, UT (US)

(73) Assignee: Hall Labs LLC, Provo, UT (US)

( * ) Notice: Subject to any disclaimer, the term of this patent is extended or adjusted under 35 U.S.C. 154(b) by 270 days.

(21) Appl. No.: 16/453,979

(22) Filed: Jun. 26, 2019

(65) Prior Publication Data
US 2020/0406693 A1 Dec. 31, 2020

(51) Int. Cl.
*B60D 1/24* (2006.01)
*B60D 1/06* (2006.01)
*B60D 1/30* (2006.01)
*B60D 1/58* (2006.01)

(52) U.S. Cl.
CPC ............... *B60D 1/247* (2013.01); *B60D 1/06* (2013.01); *B60D 1/30* (2013.01); *B60D 1/58* (2013.01)

(58) Field of Classification Search
CPC ............. B60D 1/06; B60D 1/247; B60D 1/30
See application file for complete search history.

(56) References Cited

U.S. PATENT DOCUMENTS

| | | | | |
|---|---|---|---|---|
| 2,680,626 A * | 6/1954 | Hedgpeth | ............ | B62D 53/068 280/406.2 |
| 4,230,333 A * | 10/1980 | Persyn | ................... | B60D 1/247 280/406.2 |
| 5,725,231 A * | 3/1998 | Buie | ...................... | B60D 1/247 280/455.1 |
| 6,142,500 A * | 11/2000 | Sargent | ..................... | B60D 1/02 280/405.1 |
| 2008/0073872 A1 * | 3/2008 | Scott | ........................ | B60D 1/36 280/477 |
| 2009/0008904 A1 * | 1/2009 | Scott | ........................ | B60D 1/32 280/455.1 |
| 2014/0265240 A1 * | 9/2014 | McCoy | .................... | B60D 1/06 280/405.1 |

* cited by examiner

*Primary Examiner* — Tony H Winner

(57) ABSTRACT

A trailer hitch is disclosed. A weight distribution hitch includes an attachment member with a forward end which attaches to a vehicle and a rearward end which pivotally connects to a trailer. The weight distribution hitch also includes a moment bar which attaches to the attachment member on one and tension mechanism on the other. The tension mechanism is mounted on a frame of the trailer and provides an upward force on the moment bar which imposes a moment on the attachment member. Center lines of the attachment member, moment bar, and the vehicle are all in a vertical plane. The weight distribution hitch may also include an aperture disposed in the moment bar through which the tension mechanism passes.

19 Claims, 3 Drawing Sheets

WEIGHT DISTRIBUTION HITCH

TECHNICAL FIELD

The present invention relates to trailer hitches.

BACKGROUND

A typical trailer hitch connects to a vehicle near its rear bumper. When the trailer is connected, the downward load from the trailer tongue on the hitch can cause the vehicle to squat, putting extra load on the rear axle and lessening the load on the front axle. This can reduce the traction of the front tires and can cause the headlights to point upward. Equalizer hitches can prevent these problems by using spring bars to exert a moment on the vehicle, which shifts the resulting load of the trailer tongue toward the center of the vehicle, eliminating the squat. However, equalizer hitches require tedious setup and are not easily adjusted. Changes to the tow vehicle, the trailer, or the load carried by the trailer may require readjustment. These adjustments take time and may require special tools. Because of this, users may either fail to adjust or adjust incorrectly. Accordingly, a hitch that is easier to set up and adjust is desirable.

SUMMARY

In a first embodiment of the invention, a weight distribution hitch includes an attachment member with a forward end which attaches to a vehicle and a rearward end which pivotally connects to a trailer. The invention also includes a moment bar which attaches to the attachment member on one and tension mechanism on the other. The tension mechanism is mounted on a frame of the trailer and provides an upward force on the moment bar which imposes a moment on the attachment member. Center lines of the attachment member, moment bar, and the vehicle are all in a vertical plane.

In a second embodiment of the invention, weight distribution system includes an attachment member attached to a vehicle, a moment bar attached to the attachment member, and a tension mechanism configured to be attached to the frame of a trailer. The tension mechanism has a bearing surface which abut the other end of the moment bar. The moment bar also includes an aperture disposed in the moment bar through which the tension mechanism passes.

In a third aspect of the invention, a weight distribution system includes an attachment member which attaches to a vehicle and couples to a trailer. The attachment member also hingedly attaches to a moment bar. The invention also includes a jack which is attached to the frame of a trailer, which has a bearing surface disposed near its lower end configured to abut the second end of the moment bar, and also foot configured to abut the ground. The jack has at least two modes, a first mode where the foot of the jack is on the ground, is in compression, and supports a tongue of the trailer, and a second mode where the foot of the jack is off the ground, abuts the moment bar, and is in tension.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
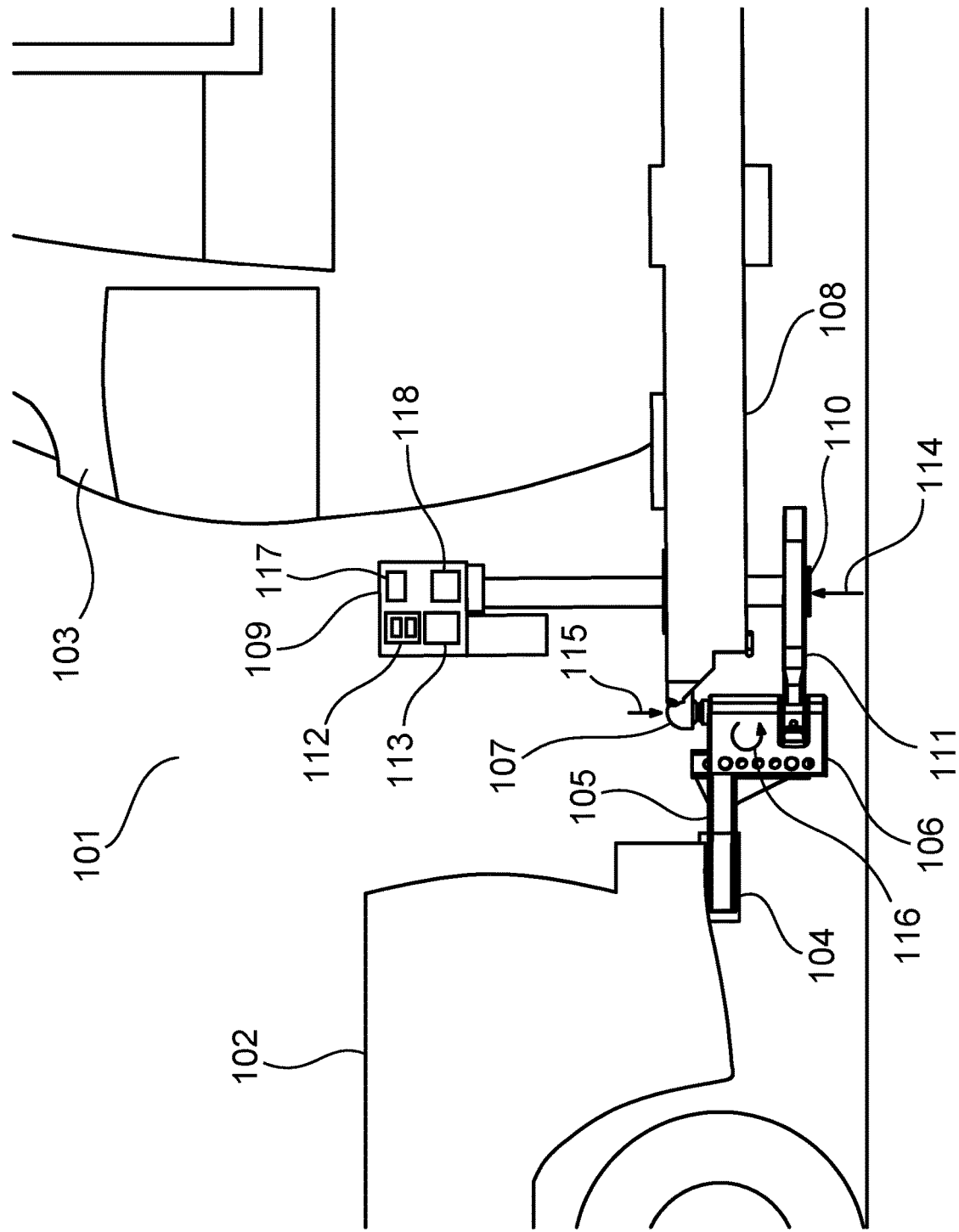
FIG. 1 is a side elevation view of one embodiment of the invention.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "hitch" is intended to have a broad meaning, referring to the hardware connecting a vehicle to a trailer including but not limited to a hitch receiver, a hitch shank, a hitch extension, a hitch head, a ball mount, a ball, and spring bars or moment bars, as context requires. It may also be used more specifically to refer to the piece that mounts underneath the vehicle, typically with bolts or welding, and contains the receiving hole for the hitch shank, as context requires.

As used herein, "forward" means toward the front of a vehicle, or the direction a vehicle travels when it is in drive and the steering wheel is in a neutral position. It also may refer to a portion of an object that faces that direction.

As used herein, "rearward" means the direction a car travels when it is in reverse and the steering wheel is in a neutral position. It also may refer to a portion of an object that faces that direction.

As used herein, "longitudinal axis" in the context of a vehicle/trailer system, is defined by a line extending from the front of a vehicle to the rear of the vehicle, through the centerline of the vehicle, and parallel to the ground. In the context of a single body, it may refer to the axis which goes through the center of the longest dimension of that body.

As used herein, "lateral axis" is orthogonal to the longitudinal axis and parallel to the ground.

As used herein, "vertical axis" is orthogonal to both the longitudinal axis and the lateral axis, or, in other words, straight up and down. Vertical axis may also apply to an axis which is not exactly straight up and down but is less than 15 degrees off.

As used herein, "forward moment" means a twisting force that would tend to tilt the front of a vehicle down and the rear of the vehicle up.

As used herein, "attachment member" means the component of a weight distribution hitch on the vehicle side that mounts to the final connecting pieces which attach to the trailer, typically the ball mount or hitch head.

Discussion

Conventional trailer hitches typically consist of a ball/coupler arrangement, wherein a ball is attached to a tow vehicle, the coupler is attached to a trailer, and the ball fits inside the coupler to create a pivotal connection. This arrangement allows forces to be transferred between the vehicle and the trailer in the longitudinal, lateral, and vertical directions but does not allow any moments to be transferred. One problem with this arrangement is that the downward force from the coupler to the ball can overload the rear axle of the vehicle, causing it to squat. This takes weight off the front wheels and can angle the headlights upward.

One way to prevent this is to use a weight distribution trailer hitch that can transfer a moment between the trailer and vehicle. A negative moment in the lateral direction, or a "forward moment," takes a load off the rear axle of the vehicle and distributes it to the front axle. This reduces the squat of the vehicle.

However, typical weight distribution hitches are tedious to hook up and adjust. They involve many connections including multiple steps at each connection and even raising and lowering the trailer multiple times. Standard weight distribution hitches have two spring bars that extend from the back of the vehicle along the frame of the trailer. These bars are used to create a forward moment on the hitch that distributes the weight toward the vehicle's front tires. In order to do that, they are attached to the frame of the trailer under extreme stress, typically with chains. The length of the chains and/or the angle of the ball mount of the hitch must be adjusted so, when the trailer is connected, the correct moment is applied. To verify it is correct, measurements must be taken and compared to the system in an unloaded state. This is typically the distance between the front bumper and the ground. The adjustment step cannot be performed while the weight distribution hitch is connected, so everything must be disconnected each time an adjustment must be made in a tedious trial and error process. This can be fairly often if items are being added or removed from the trailer, the vehicle, or additional trailers in a double-tow scenario. Additionally, the user typically steps over the hitch many times during each setup, which can be hazardous.

The present invention greatly reduces the setup and adjustment process by reducing the number of parts, simplifying the connection process, and allowing adjustments to be made without disconnecting any brackets or couplers. Further, adjustments can be made without raising and lowering the trailer multiple times. Because there are no chains or chain brackets, there are fewer parts resulting in cost savings. Costs are further reduced because many of the remaining parts can be smaller, such as the moment bar and the attachment member. The invention also improves safety by allowing the entire process to be completed on one side of the trailer.

The invention is useful on many types of connections between a vehicle and a trailer where the trailer imposes a downward force on the rear of the vehicle, such as a ball and coupler hitch or a pintle hitch. In the preferred embodiment, a vehicle has a rear mounted hitch with a ball, and a trailer has a frame mounted coupler which latches onto the ball. In one embodiment, a hitch shank and/or a ball mount has holes in a vertical row allowing the ball to be adjustable relative to the ground. In other embodiments, the ball may be adjustable relative to the ground with other adjustable mechanisms, or it may be fixed. In one embodiment, pins or bolts may be used connect the ball mount to the hitch shank.

The preferred embodiment of the invention additionally has a moment bar that extends from the attachment member rearward toward the trailer. In one embodiment, the moment bar is connected to the lower rear portion of the ball mount such that it may impose a moment on the vehicle about a lateral axis. The moment bar may be hingedly connected to the ball mount about a vertical axis so it can rotate side to side as the vehicle goes around corners.

One advantage of the present invention is that the single moment bar is not only easier to connect than dual moment bars, but it is much shorter, allowing for less material and cost savings. The moment bar may be installed on both the vehicle side and the trailer side while the user is in a single position. Also, because there is a single moment bar, which typically lies substantially on the centerline of the vehicle, the imposed moment is evenly distributed over the front tires of the vehicle. While it is possible for dual moment bars which are evenly spaced and have the same applied forces to achieve a balanced moment on the vehicle, any discrepancy in the angle of the moment bars or the tension in the chains will impose an imbalanced moment on the vehicle.

In one embodiment of the invention, the hinged moment bar connection may also serve as sway control for the trailer. Rather than rotating freely, the hinged connection may be resistive to being rotated, for example by promoting friction between the moment bar and the ball mount. Steel on steel is ideal in some applications of the invention because of its high coefficient of friction, but it comes with the drawback of corroding. Passive materials, which are less corrosive, such as brass, bronze, brake pad materials, and stainless steel, also may be used. Many of those materials, however, have less friction than steel. One embodiment of the invention includes replaceable wear plates, which allow a user to replace them if they become too worn. Alternatively, one or more springs are incorporated into the design to bias the moment bar to the neutral position, i.e. extending straight back from the ball mount. In this way, the moment arm can pivot, but that pivoting is resisted and the moment arm is biased back to the neutral position. Incorporating a resistance into the pivoting of the moment arm can help keep the trailer from swaying from side to side as the resistance inhibits the lateral movement of the trailer.

The rearward end of the moment bar is configured to receive an upward force. Because the forward end is fixed on a vertical axis, the upward force on the rearward end creates a moment on the attachment member. In one embodiment of the invention, the force is created by a lifting mechanism which is secured to the frame of the trailer. In the preferred embodiment, the lifting mechanism is a jack which has a bearing surface disposed near the bottom of a shaft that extends from the trailer frame at least as far as the moment bar. One benefit of using a jack is that it may also be used as a support for the trailer. In one embodiment of the invention, the jack is capable of being loaded in both tension and compression: tension while it is lifting on the moment bar; and compression while it is supporting the trailer.

The invention also preferably includes a bearing surface on the lifting mechanism designed to allow it to lift on the moment bar. In one embodiment of the invention, a jack has a bearing plate fixed to the shaft at a location at least as low as the bottom of the moment bar. In other embodiments, the bearing surface is spherical or another shape. The bearing plate may attach to the outer circumference of the shaft of a jack and surround the shaft, or it may attach to one side. In the preferred embodiment, the bearing surface of that plate is convex, which allows it to avoid point forces on the moment bar that the edge of a flat plate would create as the vehicle travels over a hill causing the two bearing surfaces to be unparallel. In one embodiment of the invention, the moment bar has a concave surface to better mate with the convex surface of the jack. In another embodiment, the mating surfaces are a ball and coupler similar to the ball and coupler connecting the hitch and trailer frame.

The moment bar preferably also contains an aperture allowing it to go around the shaft of the jack or a portion of the jack or other lifting mechanism. This allows the bearing surface of the moment bar to surround the jack. This has many benefits. First, it allows the tension in the shaft of the jack to be axial rather than eccentric as it would if the bearing surface was only on one side of the jack. It also locks the moment bar onto the jack which allows it to be stored on the trailer rather than the vehicle. It also prevents theft. In one embodiment of the invention, the aperture is oval or an elongated slot. This gives the moment bar more movement respective to the jack than with a circular aperture, which helps a user manipulate the moment bar into and out of its installed position in the attachment member.

In one embodiment of the invention, an indicator or switch tells the user or a controller when the vehicle or trailer is level. The level may be controlled in many different ways, including visually, mechanically, and with controlling circuitry. To control it visually, a user, after hooking the vehicle to the weight distribution hitch and trailer, may increase the tension in the jack while watching the level of the vehicle or the trailer look level. Mechanically, the user may increase the tension in the jack until a level switch or scale cuts the power to the jack, or until a scale or level indicator indicates that the user should stop adding tension to the jack. Controlling circuitry may be used to add or remove tension from the jack, which may comprise a control unit within the vehicle, on the jack, or on a personal device such as a phone. In any case, the control unit may connect to a level or a load sensor, and the on and off switch to the jack. Limit switches may be included on the level indicator or load sensor, which communicate to the motor of the jack to start or stop. In one embodiment of the invention, limit switches are located on the level or load sensor. In another embodiment, limit switches are programmed into a control unit.

The additional load from the lifting mechanism can be measured in many different places. It may be measured within a trailer jack, the trailer coupler, or on the hitch, as disclosed in U.S. Pat. No. 7,960,659 B2, which is hereby incorporated by reference in its entirety. It may also be measured within the ball of the hitch as disclosed in US patent publication number US 2006/0290102 A1, which is hereby incorporated by reference in its entirety.

In one embodiment of the invention, the load on the moment bar is measured by the tension in the jack as measured by the resistance to an electric motor controlling the jack. This is typically done by measuring the amperage to the motor, as the amperage is directly related to the load on the motor. The amperage meter wirelessly communicates via Bluetooth or other wireless means to a controlling device, such as a phone. The controlling device may have access to data determining what the maximum load on the motor should be either locally or through network communication. The user device communicates wirelessly with a power switch on the motor and stops the motor when the desired load is reached. In other embodiments of the invention, a scale or level replace the amperage meter as the measuring device that communicates with the user device.

Another advantage of the invention is that it can be adjusted when the vehicle is in motion. Weight distribution hitches maintain a desirable forward moment on the vehicle that is typically dependent on the vehicle and trailer being on flat ground. When a vehicle with a weight distribution hitch goes over a hill or a bump, the forward moment from the device can be undesirable. If the vehicle goes over a hill, the moment will be decreased causing the front of the vehicle to aim upward. This is especially dangerous if the vehicle is driving at night, and the headlights are pointed upward as the driver needs to see downward. Conversely, if the vehicle drives through a depression in the ground, the moment will be increased and will force the front of the vehicle downward. This can be especially dangerous if the pressure on the rear wheels is reduced to the point where they don't have good traction, or even worse, if the rear wheels are lifted off the ground.

One embodiment of the present invention includes a weight distribution hitch that can prevent these problems by changing the weight distribution as the vehicle travels over uneven ground. In one embodiment, a load sensor indicates a change in load as the vehicle and the trailer are on uneven ground. The load sensor may communicate wirelessly with a control unit, such as a phone or built-in processor, which may communicate with the motor on the jack to adjust accordingly. When the trailer is going over a bump or hill, the load sensor will communicate a decreased tension on the jack to the control unit which will communicate to the motor to increase tension on the jack, which will help keep the vehicle pointed level, and vice versa. Then, when the vehicle returns to flat ground, the sensor will communicate an increased tension which will result in the control unit reducing the tension in the jack to normal, and vice versa.

The invention may also be used to prevent or reduce trailer porpoising, which is the up and down oscillation of a trailer and vehicle, in response, for example, to hitting a bump. This can be similar to a slinky rising and falling as it is held at each end. A load sensor or level sensor in the weight distribution hitch or jack will sense an increase and decrease of load or level as the vehicle/trailer system oscillates. In one embodiment of the invention a load sensor in the jack is wirelessly coupled to a control unit, such as a phone or built-in processor, in the vehicle. As the control unit receives data that the trailer is porpoising, or is in a state that could cause porpoising, the control unit may communicate to the motor of a jack to increase tension or decrease tension as the system may require to prevent the porpoising. When the weight distribution hitch is in a higher than normal position, a decreased tension will help lower its position. When the weight distribution hitch is in a lower than normal position, an increased tension will raise its position. However, to prevent porpoising, the control unit may be configured to decrease tension as the hitch is in a lower than normal position but raising upward, and to increase tension as the hitch is in a higher than normal position but falling. This way, the weight distribution hitch absorbs the energy of the vehicle/trailer system and acts as a porpoising dampener.

Now referring to FIG. 1, which shows one embodiment of the invention using an electric jack as a lifting mechanism. A weight distribution system 101 couples a vehicle 102 to a trailer 103. The system comprises a hitch receiver 104 connected to the underside of the vehicle 102. Extending rearwardly from the hitch receiver 104 is a shank 105, a ball mount 106, and a ball which is partially hidden under the coupler of the trailer 107. The hitch receiver 104, shank 105, ball mount 106, and ball are all connected to the vehicle. On the trailer side of the system are a coupler 107, a frame 108, and a jack 109. The jack also contains a foot 110. A moment bar 111 may be a part of the truck side of the system or the trailer side of the system depending on user or manufacturer preference. The jack has at least two positions, an up position and a down position. While the foot is down, the jack supports the weight of the trailer and its shaft is in compression. While it is up, the foot abuts the underside of the moment bar 110 and the shaft is in tension between the moment bar 111 and the frame 108. The jack also has user controls 112, which typically includes a switch or buttons to move the jack between position one and position two, or to an intermediate position. That jack may be configured to weigh the load on the jack, either in compression, in tension, or both, and using load sensor 118 display the load on a load indicator 113. It may also communicate the load to a controller, such as a phone. Level or level sensor 117 is used to determine the angle of the trailer relative to horizontal.

As depicted in FIG. 1, when the invention is in use to distribute the load forward on the vehicle, an upward force 114 increases the tongue weight 115 and imposes a moment 116 on the ball mount 106, which translates through the vehicle 102, adding a downward force to the front tires and an upward force to the rear tires, balancing the vehicle.

Figure 2:
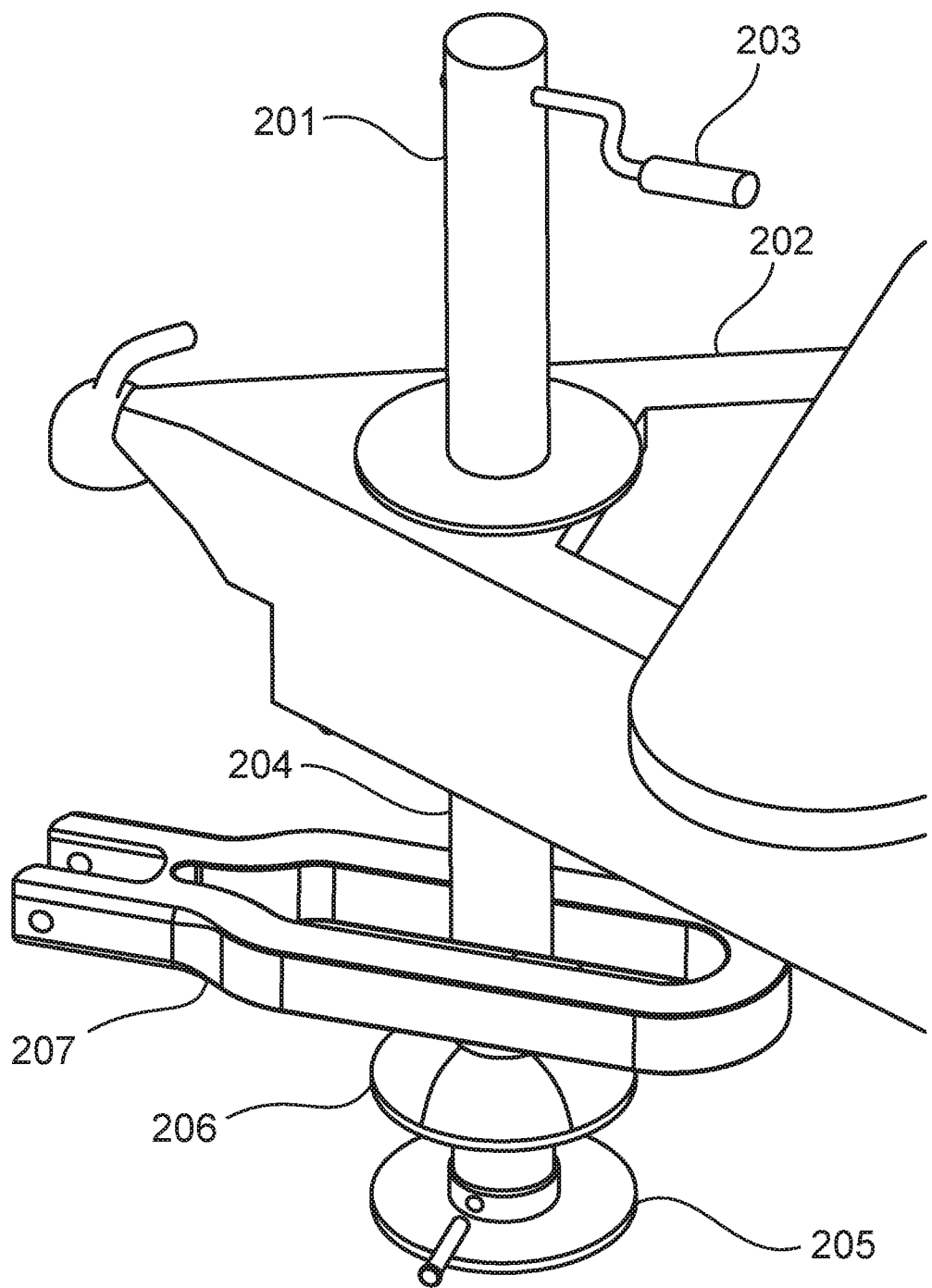
FIG. 2 is a perspective view of another embodiment of the invention including a moment bar with an aperture.

Now referring to FIG. 2, which shows another embodiment of the invention that includes a bearing plate on the jack. A jack 201 is mounted to the frame of a trailer 202. The jack includes a hand crank 203 to raise and lower the shaft 204. A foot 205 caps the bottom of the shaft 204 and gives a jack a stable bearing surface for the ground. A bearing plate 206 is attached to the shaft further up from the foot. In some embodiments of the invention, the bearing surface is flat, however, the depicted embodiment shows a convex surface. When the jack is in tension between the frame 202 and the moment bar 207, the convex shape of the bearing plate allows the abutting surfaces to roll slightly when the vehicle goes over bumps, rather than creating extreme point loads that an edge of a flat plate would create when the two surfaces are not parallel.

FIG. 2 also illustrates the way the moment bar 207 is locked onto the jack 201. In this configuration, the moment bar may be stored on the trailer with less risk of theft. This is also beneficial to users who would rather not have a moment bar or bars attached to their vehicles. However, other embodiments of the invention use moment bars that are easily removable from the jack, such as an open-ended bar that resembles a tuning fork.

Figure 3:
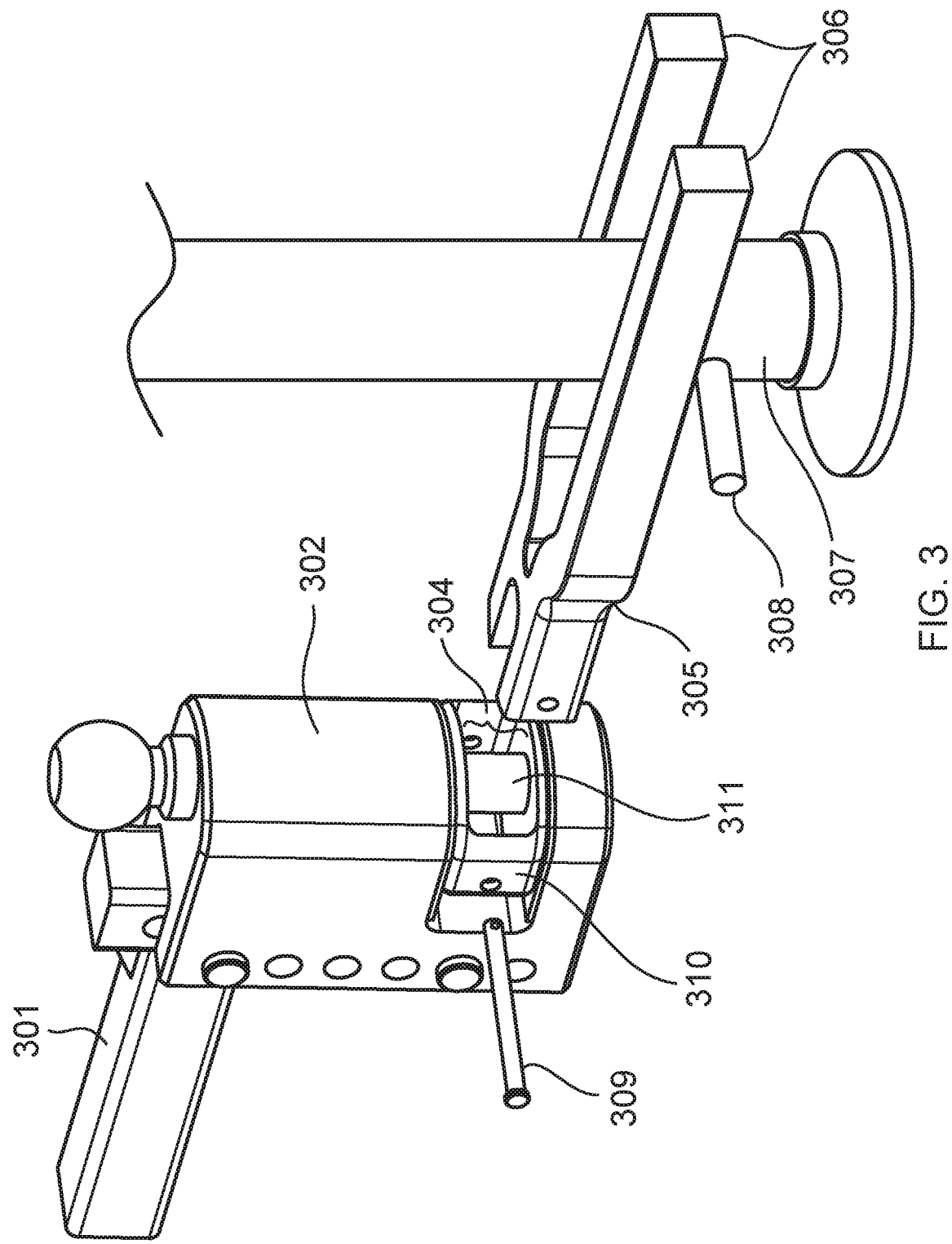
FIG. 3 is a perspective view of yet another embodiment of the invention.

Now referring to FIG. 3, which illustrates one embodiment of the way the invention may attach to a ball mount and an alternative configuration to abut the tension member. A hitch shank 301 is pinned to a ball mount 302 through a series of holes allowing the attachment to be adjustable. The upper end of the ball mount is attached to a ball 303 for coupling to a trailer, whereas the lower end of the ball mount includes a socket 304 designed to receive a moment bar 305. In this configuration, the socket 304 pivots about a central pin 311. In other configurations the socket does not rotate, but the moment bar rotates within the socket. The socket 304 includes an upper bearing surface and a lower bearing surface which translate the moment from the moment bar 305 to the ball mount 302. They also may provide friction to assist with sway control for the trailer. The upper bearing surface and lower bearing surface may be made of steel, for ease of manufacturing and cost, but they may also be made of other materials in order to provide different properties for the connection, such as rust prevention and friction. A pin 309 keeps the moment bar 305 from slipping out of the socket 304.

In the embodiment of FIG. 3, the moment bar 305 has two prongs 306 which abut a bearing surface on the jack 307. In the depicted embodiment, the bearing surface is provided by pegs, however, it may also be another shape such as the bearing plate of FIG. 2, D-rings, or other.

The invention has been described with reference to various specific and preferred embodiments and techniques. Nevertheless, it is understood that many variations and modifications may be made while remaining within the spirit and scope of the invention.

What is claimed is:

1. A weight distribution hitch comprising:
   an attachment member with a forward end configured to rigidly attach to a vehicle and a rearward end extending rearwardly toward a trailer, the rearward end having an upper portion and a lower portion, the upper portion configured to pivotably attach to a coupler of the trailer;
   a moment bar comprising a forward end and a rearward end, the forward end pivotably attached to the lower portion of the rearward end of the attachment member, so as to constrain movement of the moment bar to pivoting about a vertical axis;
   a tension mechanism comprising a jack mounted on a frame of the trailer and configured to decrease a distance between the rearward end of the moment bar and the frame, so as to impose a moment on the attachment member, and wherein a greater decrease in the distance imposes a greater moment;
   wherein centerlines of the attachment member, moment bar, and the vehicle are all in a vertical plane, when the vehicle is traveling in a straight line.

2. The weight distribution hitch of claim 1 wherein the upper portion of the rearward end of the attachment member comprises a hitch ball.

3. The weight distribution hitch of claim 1 further comprising a level sensing mechanism and a limit switch configured to stop the jack from raising when the level sensing mechanism detects a predetermined level.

4. The weight distribution hitch of claim 1 wherein the tension mechanism further comprises one or more electrical switches allowing the jack to be raised or lowered automatically.

5. The weight distribution hitch of claim 4 further comprising a load sensor configured to measure a load on the jack.

6. The weight distribution hitch of claim 5 further comprising a limit switch configured to stop the jack from raising when the load sensor detects a predetermined load.

7. The weight distribution hitch of claim 1 wherein the attachment member comprises a height adjustment mechanism facilitating raising and lowering the upper portion relative to the height of the vehicle.

8. The weight distribution hitch of claim 1 wherein the jack comprises a bearing plate disposed around a shaft of the jack and wherein a bearing surface of the bearing plate is convex.

9. The weight distribution hitch of claim 8 wherein the bearing plate is also a foot of the jack.

10. The weight distribution hitch of claim 1 wherein the jack is operational as a trailer support when the trailer is in a static mode and a tension mechanism when the trailer is in a mobile mode.

11. A weight distribution system comprising:
an attachment member configured to be rigidly attached to a vehicle;
a moment bar with a first end and a second end, the first end configured to hingedly attached to the attachment member;
a tension mechanism comprising a jack configured to be attached to a frame of a trailer, the tension mechanism comprising a bearing surface disposed near its lower end configured to abut the second end of the moment bar;
an aperture disposed in the moment bar through which the tension mechanism passes;
wherein, when the tension mechanism is put in tension, the moment bar is pulled toward the frame of the trailer.

12. The weight distribution hitch of claim 11 further comprising a motor configured to add or remove tension from the tension member.

13. The weight distribution hitch of claim 12 further comprising a limit switch configured to turn the motor off when the limit switch is activated.

14. The weight distribution hitch of claim 13 wherein the motor comprises an electric motor.

15. The weight distribution hitch of claim 14 wherein the limit switch is in electrical communication with a level.

16. The weight distribution hitch of claim 11 wherein the aperture is vertical such that it extends from a top side of the moment bar through to a bottom side of the moment bar.

17. The weight distribution hitch of claim 16 wherein the aperture is elongated.

18. A weight distribution system comprising:
an attachment member with a forward end and a rearward end, the forward end configured to attach to a vehicle and the rearward end extending rearwardly toward a trailer, the rearward end having an upper portion and a lower portion, the upper portion configured to attach to a coupler of the trailer and the lower portion configured to receive a moment bar;
the moment bar with a first end and a second end, the first end hingedly attached to the attachment member;
a jack configured to be attached to a frame of the trailer, the jack comprising a bearing surface disposed near its lower end configured to abut the second end of the moment bar, the jack also comprising a foot configured to abut the ground;
wherein the jack is moveable between two position, a first position wherein the foot of the jack is on a ground surface, the jack is in compression, and the jack supports a tongue of the trailer, and a second position wherein the foot of the jack is off the ground, the bearing surface abuts the moment bar, and the jack is in tension.

19. The weight distribution hitch of claim 18 wherein the bearing surface is convex.

* * * * *